3,112,248
Patented Nov. 26, 1963

1

3,112,248
YEAST-BIOFLAVONOID COMPOSITION AND
PROCESS OF PRODUCING THE SAME
Jerry M. Sudarsky, Wasco, and Robert A. Fisher, Bakersfield, Calif., assignors to Bioferm Corporation, Wasco, Calif., a corporation of Nevada
No Drawing. Filed Jan. 26, 1959, Ser. No. 788,705
5 Claims. (Cl. 195—16)

This invention is directed to a new and useful yeast-bioflavonoid composition and to a process for the preparation thereof.

Bioflavonoids are in common use for a variety of medical and pharmaceutical purposes and they are commonly derived from citrus fruits and, more particularly, from citrus molasses by processes which commonly involve dehydration of source materials followed by extraction operations, or which involve precipitation of the bioflavonoids by means of heavy metal compounds. As so produced they are quite expensive.

In accordance with our invention, yeast-bioflavonoid compositions are produced in which the bioflavonoids are in their natural state and, in combination with the values present in yeast as produced in the manner hereafter described, the resulting compositions open avenues in the field of nutritional products not heretofore appreciated. The bioflavonoids do not require extraction but, as recovered together with the yeast, they are in the form of products having quite high concentrations of bioflavonoids, generally of the order of ½% to 8% by weight, and usually approximately 2%. This makes for highly economical production of bioflavanoids.

In accordance with this invention, the particularly preferred starting raw material from which the yeast-bioflavonoid compositions are prepared is citrus molasses, which is a by-product of the citrus fruit canning industry. Citrus molasses is a bitter-tasting brownish syrup which usually contains up to 40% of reducing sugars in addition to small quantities of bioflavonoids as well as other constituents. While citrus molasses represents the especially advantageous starting material, it will be understood that it is within the broader aspects of this invention to utilize, as starting materials, other bioflavonoid-containing by-products of citrus operations and from which hesperidin or like materials have been or are removed. The invention will be described in connection with the use of citrus molasses as the starting material although, as indicated, it is not to be so delimited.

In carrying out the process of this invention for the production of the yeast-bioflavonoid compositions, to the extent that the citrus molasses contains suspended solids, which will almost invariably be the case, such suspended solids are initially removed. This may conveniently be done by diluting the citrus molasses with warm water to a 50% weight to volume concentration and mixing with small amounts of diammonium phosphate and magnesium sulfate, for instance, 1% of diammonium phosphate and 0.1% magnesium sulfate based on the weight of the citrus molasses. The resulting mixture is adjusted to a pH of 5.5 with aqua ammonia, is then heated to 95–105 degrees C. for about 15 minutes, and is filtered hot on a filter aid bed to provide a clarified liquor for use in subsequent steps of the process. While the above described procedure has been found to be very suitable for effecting clarification of the citrus molasses, it will be understood that any other clarification techniques and procedures can be used so long, of course, as they are not of such character as to destroy or cause undue destruction of the bioflavonoids or the fermentable sugars, or interfere with the carrying out of the remaining steps of the process.

The clarified citrus molasses is next fermented with a yeast. It is especially desirable and advantageous to employ ordinary bakers' yeast (*Saccharomyces cerevisiae*). The fermentation with bakers' yeast can be carried out in accordance with techniques which are, per se, well known in the art (Yeast Technology, John White, John Wiley and Sons, Inc., New York, 1954, chapters 4, 5 and 6). Thus, for instance, the fermentation may be started with a seed consisting of 6% bakers' yeast solids and 1.6% monoammonium phosphate, based on the weight of the citrus molasses, the clarified citrus molasses being added in logarithmic increments during the fermentation. The temperature of the fermentation is preferably maintained at about 30 degrees C. and the pH is controlled throughout by the addition of aqua ammonia. Approximately 0.5% nitrogen, minimum, based on the weight of the citrus molasses, is used, in the form of aqua ammonia. At the conclusion of the fermentation, the yeast cells are removed by centrifugation, for example, by conventional yeast separators and dried.

The following example is illustrative of a particularly preferred process for producing the yeast-bioflavonoid compositions in accordance with the present invention. It will be understood that various changes and modifications may be made, in the light of the guiding principles disclosed above, without in any manner departing from the novel teachings provided herein.

*Example*

(a) 12 kilograms of commercial citrus molasses were diluted with warm water to a volume of 24 liters. 120 grams of diammonium phosphate were added to this suspension as a flocculating agent and nutrient for the subsequent yeast fermentation. In addition, 12 grams of magnesium sulphate ($MgSO_4.7H_2O$) were added as a yeast nutrient. The suspension was stirred for 15 minutes at a temperature of 95–105 degrees C. and then filtered hot on a bed of "Hy Flo" filter aid.

(b) 96 liters of water were added to a 150-liter tin lined fermenting vessel which was equipped with a device for distributing air under pressure at the bottom of the fermentor. 192 grams of monoammonium phosphate were dissolved in the water after which 720 grams of bakers' yeast on a dried solids basis were suspended in the fermentor. Air was turned into the distributor at the rate of 19 cubic feet per minute per square foot of bottom area. At this time the clarified citrus molasses liquor from part (a) was added on an hourly basis in the following percentages: 10–12–12–15–15–15–15–6. At the end of 3 hours the aeration rate was increased from 19 to 22 cubic feet per minute per square foot of bottom area. During the 8-hour fermentation, the pH was controlled within the range of 5 to 6 by the addition of aqua ammonia. The amount of aqua ammonia required for this neutralization process was equivalent to 0.5% nitrogen based on the weight of the citrus molasses used. At the conclusion of the fermentation the yeast was harvested by centrifugation and dried and was found to total 2576 grams yeast solids. The weight of sugar found to be consumed was 3528 grams. Using the figure of net yeast solids produced of 1856 grams the yeast yield was found to be 52.6% of the sugar consumed. The yeast contained about 6%, by weight, of bioflavonoids.

What is claimed as new and desired to be protected by Letters Patent of the United States is:

1. In a process for preparing a new and useful yeast-bioflavonoid composition, the steps which comprise providing a clarified bioflavonoid- and fermentable sugar-containing by-product from citrus fruit treatment, fermenting said clarified by-product by means of an edible yeast to effect removal of fermentable sugars, and recovering a yeast-bioflavonoid composition containing at least ½%, by weight, of bioflavonoids.

2. In a process for preparing a new and useful yeast-bioflavonoid composition, the steps which comprise fermenting clarified citrus molasses by means of *Saccharomyces cerevisiae* to effect removal of fermentable sugars, and recovering a yeast-bioflavonoid composition containing from about 2% to 8%, by weight, of bioflavonoids.

3. In a process for preparing a new and useful yeast-bioflavonoid composition, the steps which comprise clarifying citrus molasses to remove suspended solids therefrom, fermenting said clarified citrus molasses by means of *Saccharomyces cerevisiae* to effect removal of fermentable sugars, and recovering a yeast-bioflavonoid composition containing from about 2% to about 8%, by weight, of bioflavonoids.

4. In a process of preparing a new and useful yeast-bioflavonoid composition, the steps which comprise providing a bioflavonoid and fermentable sugar-containing by-product from citrus fruit treatment, said by-product containing suspended solids, diluting said by-product with water, mixing therewith small amounts of diammonium phosphate and magnesium sulfate, heating, filtering, and fermenting the filtrate by means of an edible yeast to effect removal of fermentable sugars, and recovering a yeast-bioflavonoid composition containing at least ½%, by weight, of bioflavonoids.

5. In a process of preparing a new and useful yeast-bioflavonoid composition, the steps which comprise diluting citrus molasses, which contains suspended solids, with water, mixing therewith small proportions of diammonium phosphate and magnesium sulfate, heating to about 95–105 degrees C., filtering, fermenting said filtrate by means of *Saccharomyces cerevisiae* to effect removal of fermentable sugars, and recovering a yeast-bioflavonoid composition containing about 2% to 8%, by weight, of bioflavonoids.

References Cited in the file of this patent

UNITED STATES PATENTS

| | | |
|---|---|---|
| 2,285,465 | Schultz et al. | June 9, 1942 |
| 2,354,281 | Schultz et al. | July 25, 1944 |
| 2,440,545 | Jeffreys | Apr. 27, 1948 |
| 2,888,381 | Freedman et al. | May 26, 1959 |

OTHER REFERENCES

"Some Biological Effects of the Flavonoids," Jour. Am. Pharm. Assn., July 1955, 44: 7, pp. 404–408.

"On the Therapeutic Uses of Citrus Bio-Flavonoids," Clinical Medicine, August 1955, 2: 8, pp. 787–792.

Dispensatory of the U.S.A., 25th ed., Part I, 1955, J. B. Lippencott Co., Phila., Pa., pp. 1512–1513, "Dried Yeast."

Cook: The Chemistry and Biology of Yeasts, Academic Press, Inc., N.Y., 1958, pp. 560–567.